United States Patent [19]

Kniazzeh

[11] 4,256,813
[45] Mar. 17, 1981

[54] METHOD AND APPARATUS FOR MANUFACTURING BATTERY VENTS AND VENTED BATTERIES

[75] Inventor: Alfredo G. Kniazzeh, West Newton, Mass.

[73] Assignee: Polaroid Corporation, Cambridge, Mass.

[21] Appl. No.: 113,551

[22] Filed: Jan. 21, 1980

Related U.S. Application Data

[60] Division of Ser. No. 852,920, Nov. 18, 1977, which is a continuation-in-part of Ser. No. 761,653, Jan. 24, 1977, abandoned.

[51] Int. Cl.³ .............................................. H01M 2/12
[52] U.S. Cl. ..................................... 429/86; 429/152; 427/411; 29/623.3
[58] Field of Search .......................... 429/86, 152, 162; 29/623.3; 156/276, 306.3, 309.9; 427/121, 411; 428/233, 342, 478.8, 479.6, 496, 530

[56] References Cited

U.S. PATENT DOCUMENTS

| | | | |
|---|---|---|---|
| 2,632,784 | 1/1959 | Soltis | 136/133 |
| 3,081,371 | 3/1963 | Toda | 136/111 |
| 3,647,557 | 3/1972 | Kegelman | 136/177 |
| 3,701,690 | 10/1972 | Dermody et al. | 29 623.3/ |
| 3,741,812 | 6/1973 | Spelman et al. | 136/107 |
| 3,741,813 | 6/1973 | Bergum et al. | 136/107 |
| 3,837,995 | 9/1974 | Floden | 156/306.3 |
| 3,870,566 | 3/1953 | Marsal et al. | 136/111 |
| 3,927,245 | 12/1975 | Roth et al. | 427/411 |
| 4,105,831 | 8/1978 | Plasse | 429/86 |

*Primary Examiner*—Donald L. Walton
*Attorney, Agent, or Firm*—John W. Ericson

[57] ABSTRACT

A vent for thin, flat laminar batteries comprising a paper strip enclosed along its length by a gas-permeable, liquid impermeable thermoplastic composition. One or more of the vents can be incorporated into a frame structure which also serves to provide internal and external sealing. For this purpose, the vents are sealed to frames comprising closed loops of thermoplastic material, dimensioned to correspond to the external and internal dimensions of the battery. Methods of making vents comprising the steps of laminating paper with a thermoplastic material and forming the laminate into thermoplastic tubes filled with a paper core.

24 Claims, 16 Drawing Figures

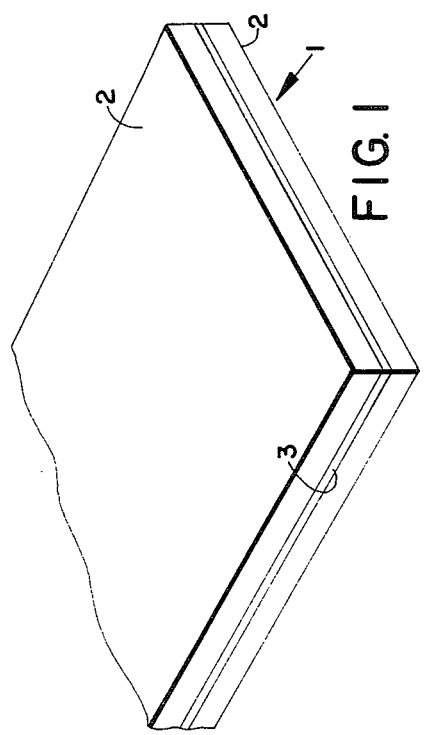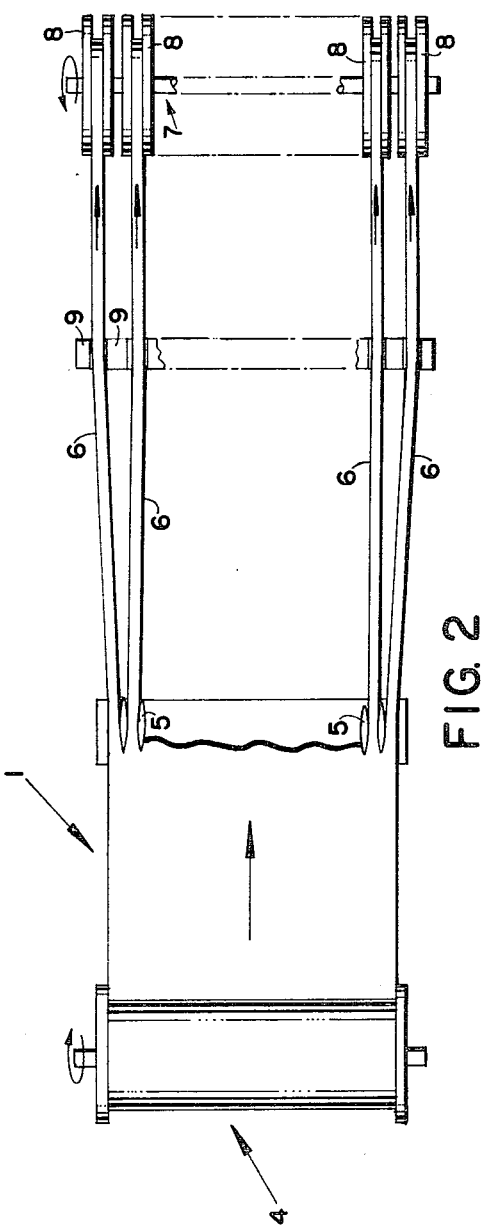

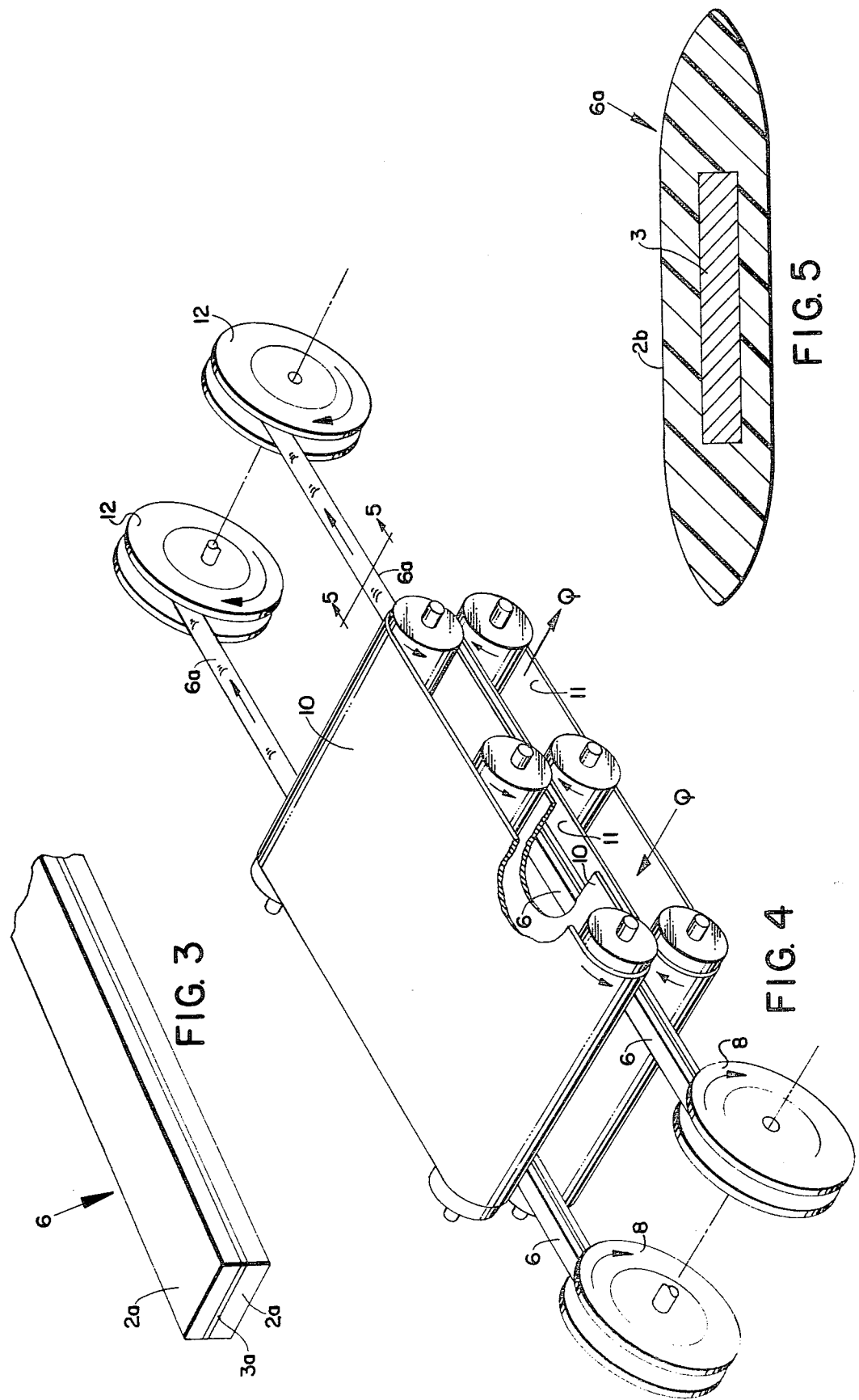

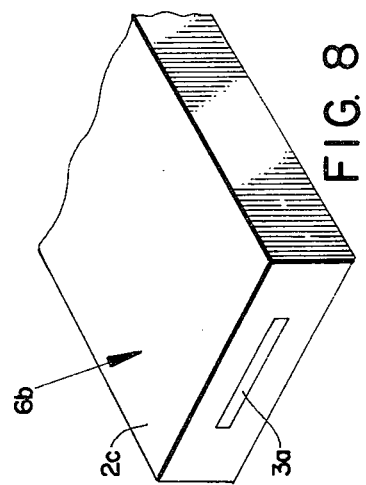
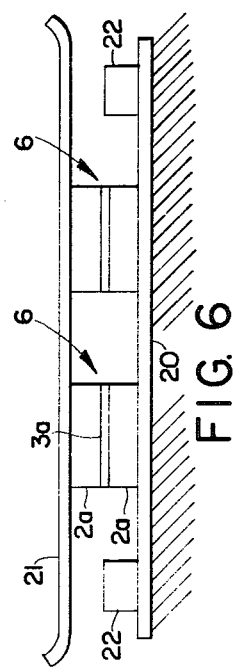
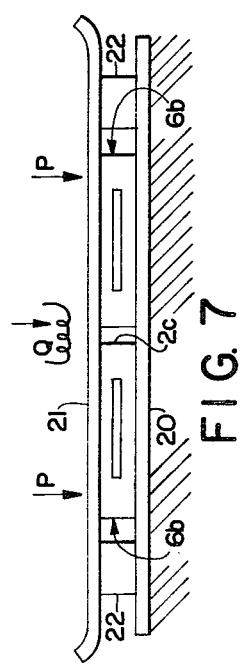

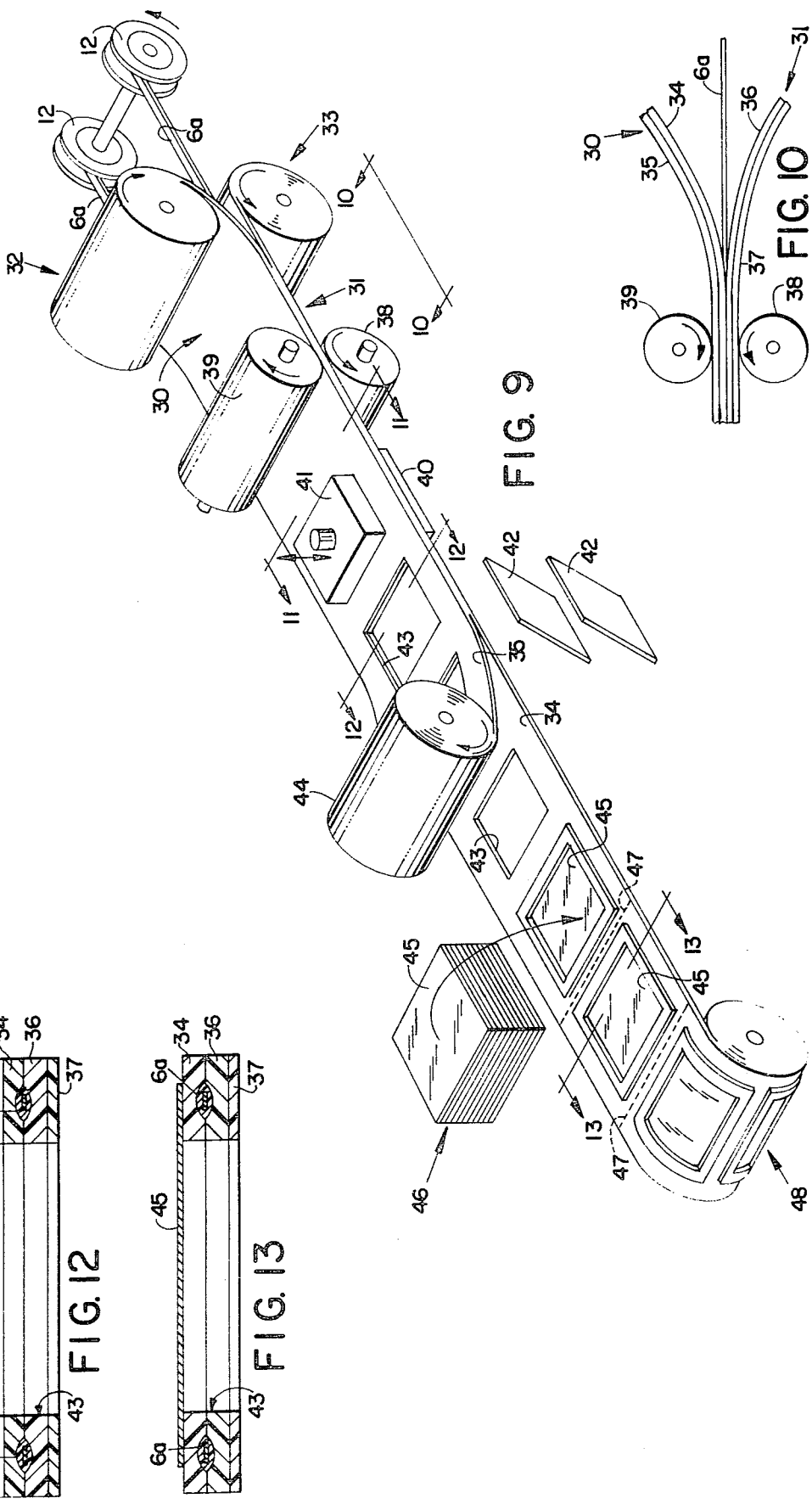

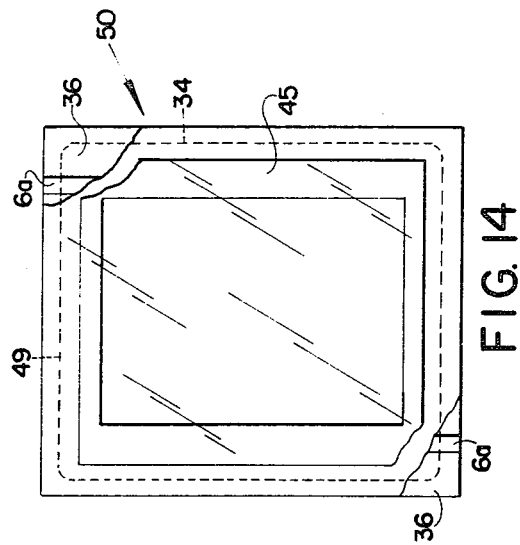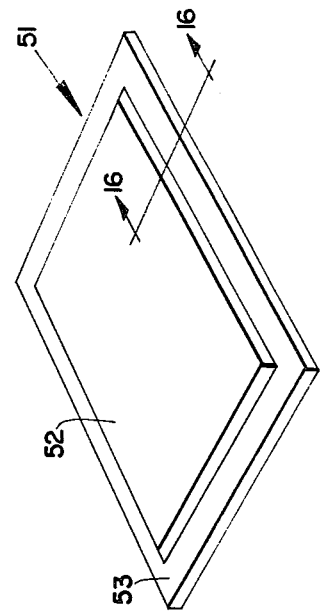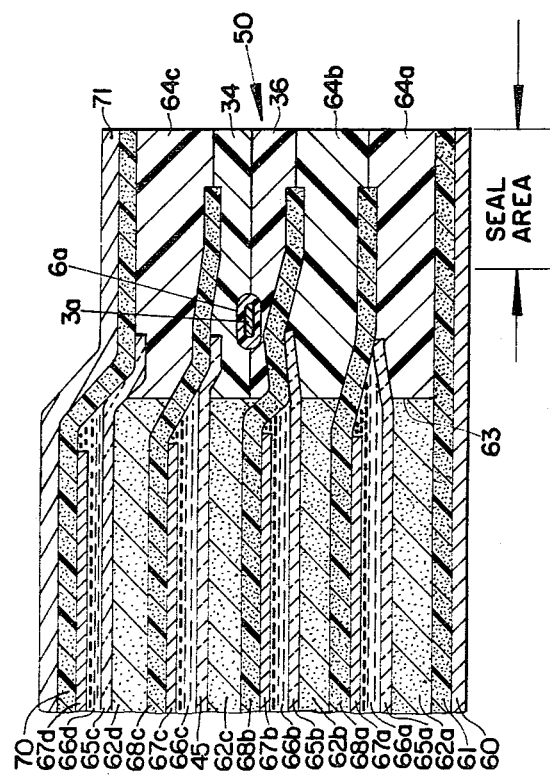

METHOD AND APPARATUS FOR MANUFACTURING BATTERY VENTS AND VENTED BATTERIES

This is a division of application Ser. No. 852,920, filed Nov. 18, 1977, which is in part a continuation of my copending U.S. application Ser. No. 761,653, now abandoned filed on Jan. 24, 1977 for Method and Apparatus for Manufacturing Battery Vents and Vented Batteries and assigned to the assignee of this application.

This invention relates to laminar electrical cells and batteries, and more particularly to novel methods and apparatus for venting such batteries.

Presently flat unicell or multicell batteries are utilized as power supplies to actuate motor-driven film processing means and optical adjustment apparatus including shutter control apparatus in automated cameras adapted to effect sequential exposure and development of photographic film. Representative cameras of this kind are described, for example, in U.S. Pat. Nos. 3,750,551, 3,744,385, 3,731,608 and 3,714,879. In these applications, the battery should be thin and compact and should have a relatively low impedance to produce a high output current over a time period corresponding to a reliable shelf life. Batteries presently made for this purpose are composed of cells having a plurality of flat layers including a positive electrode, a negative electrode and an electrolyte-containing layer which layer itself can comprise one or more layers. In multicell batteries, the cells are separated by an electrically conductive layer such as a conductive plastic material which functions also to prevent electrolyte migration between cells. The electrically conductive layer is positioned between adjacent cells to contact the negative electrode of a cell and the positive electrode of the next adjacent cell. The periphery of the battery construction is sealed to prevent or minimize water liquid or vapor loss from the cells and to prevent contamination of the cell by the ambient atmosphere.

A major problem associated with these batteries is that the materials comprising the electrolyte cause formation of hydrogen-rich gas within the battery. If the gas pressure within the battery is not controlled, the battery will expand and the layers within the battery become separated, thereby seriously reducing electrical conductivity between the cells and the current output of the battery. In addition, gas formation increases the battery thickness so that it cannot be used in the camera for which it is designed. Furthermore, the increased gas pressure reduces the integrity of the battery seals. A broken battery seal renders the battery inoperative within a short time.

A variety of battery venting means presently are available for selectively removing gas from the battery interior while preventing liquid water removal and preventing invasion of the outside atmosphere into the battery.

U.S. Pat. No. 3,870,566 discloses a venting system for a thin flat battery comprising at least one solid or hollow fiber formed of a material previous to the gas produced in the battery. The hollow interior of the fibers communicate with the atmosphere and are positioned adjacent a liquid-impervious, gas-pervious plastic layer which separates the hollow fibers from contact with either the electrodes or the electrolyte.

U.S. Pat. No. 3,647,557 discloses a battery which includes a hollow fiber formed from a liquid-impermeable plastic material that is pervious to the gas produced in the battery. The fiber extends through the battery wall into the battery interior either in contact with the liquid electrolyte or into the space above the electrolyte. The exterior of the fiber wall is sealed at the points where it extends through the battery wall and is formed so that its interior does not communicate directly with the battery interior.

U.S. Pat. No. 3,741,813 describes a battery which includes a non-conductive gas-pervious, liquid-impervious outer wall to house the electrodes and the electrolyte. A conductive liquid-impervious, gas-pervious membrane is positioned adjacent the wall and is sealed around the perimeter of a hole in the wall. The membrane has at least one hole that communicates the wall to the battery interior. The hole in the wall is offset from the membrane holes to expose the conductive membrane to the atmosphere.

U.S. Pat. No. 3,741,812 shows a battery construction similar to that shown in U.S. Pat. No. 3,741,813 except that the outer wall is electrically conductive and contains a hole, while the membrane sealed to the hole and located between the outer wall and the battery interior is non-conductive and does not contain a hole. In the batteries disclosed by these patents, the holes and gas pervious walls and membranes prevent gas build-up within the battery and permit introduction of oxygen into the battery where the positive electrode comprises an oxidizing agent.

U.S. Pat. No. 2,632,784 dicloses a battery vent formed of a flat tape comprising woven fibers backed with a gas-permeable adhesive which is sealed longitudinally to a stack of cells forming the battery wherein at least one end of the tape is open to the atmosphere. U.S. Pat. No. 3,081,371 discloses a venting means for a cell comprising a hole in a wrapping film for the electrodes positioned to minimize electrolyte leakage.

While the prior art battery venting means provide a degree of success in venting gas formed within the batteries, they have afforded only inconsistent performance which has resulted in reduced battery life. This is particularly serious when the battery is utilized integrally with film such as in the automated cameras described in the above-identified patents since the film as well as the battery cannot be used. The hollow fibers described in U.S. Pat. Nos. 3,647,557 and 3,870,566 have an internal diameter on the order of about 5 to 50 microns and during processing for inclusion in the battery easily can become crimped to form an obstruction to the passage of gas. Furthermore, the hollow fibers can be closed by virtue of increased pressure within the battery during storage. Thus, the reliance upon hollow fibers as a venting means easily can lead to a battery which rapidly becomes inoperative. This problem is not overcome merely by providing a larger number of fibers than needed for optimal venting since, in this case, the increased number of fibers provide additional access of the outside atmosphere, primarily oxygen, to the battery interior through the gas-permeable fiber walls to react with the materials in the battery to render it inoperative for its intended purpose.

The provision of holes in the walls of a battery construction as disclosed in U.S. Pat. Nos. 3,741,812, 3,741,813 and 3,081,371 also can lead to inconsistent battery performance in that great care must be taken to assure complete sealing around the periphery of the hole in one lamina to an adjacent lamina to minimize gas leakage from the atmosphere into the battery and to prevent excess removal of water liquid or vapor to the atmosphere. Thus incomplete sealing leads to rapid deterioration of the battery that renders it inoperative for its intended purpose. This same problem is present with the tape venting means disclosed by U.S. Pat. No. 2,632,784.

In copending U.S. application for Letters Patent Ser. No. 761,649, filed on Jan. 24, 1977 by Paul A. Plasse for "Vented Flat Battery" and assigned to the assignee of this application, now U.S. Pat. No. 4,105,831, there is described a flat battery which is vented by means of hollow tubes formed from a hydrogen-permeable, liquid-impermeable composition wherein the hollow tubes are packed with fibers to form a gas diffusion passage of uniform external cross section through and around the interstices between the fibers. This construction provides a significant advantage in reliability and reproducibility, particularly in the seal area where the vent passes from the interior of the battery into communication with the atmosphere. Hollow tube vents would be particularly difficult to seal without closing or deforming the tubes. In a fiber tape vent sealed with an adhesive, enough adhesive to make a liquid tight seal would fill the interstices between the fibers, resulting in a fiber diffusion barrier of unpredictable length and cross section. The fiber packed tube, however, can be tightly sealed between the battery components in the seal area without distortion of the tube.

The construction of a fiber packed vent tube of appropriate dimensions for small batteries presents practical difficulties. In concept, one might coat a thread formed of spun or twisted fibers with a thermoplastic resin to form such a packed tube, or, first forming the tube in any conventional manner, draw the thread through it with a needle. The first approach has been found impractical because the coating resin fills the interstices between the fibers. This may occur to a greater or lesser degree, resulting in a gas diffusion passage of variable geometry from vent to vent and questionable integrity in the tube wall. Alternatively, if the fibers are filled completely and the tube walls are completely free of pinholes, one has a uniform product but one that incorporates only a single gas diffusion impedance mechanism. Considerations of cost militate strongly against any attempt to install the fibers after the tube is manufactured.

The objects of this invention are to facilitate the manufacture of fiber packed vent tubes of uniform gas diffusion characteristics, to simplify the manufacture of vented batteries incorporating vent tubes of this kind, and to increase the gas permaselectivity of a battery venting system.

Briefly, the above and other objects of the invention are attained by a novel vent construction in which a narrow strip of paper forms the packing fibers that will fill the vent tube. Strips of thermoplastic material are laminated on each side of the paper. In accordance with one embodiment of the invention, these laminated strips are laminated between and sealed to frame elements of the battery, forming a vented frame that is assembled and sealed to other components of the battery. In accordance with another embodiment of the invention, the laminated strips are heated under pressure so that the thermoplastic strips flow together around the edges of the paper strip between them, forming a thin, flat closed thermoplastic tube packed with fibers, without filling the fibers. This tube is cut into appropriate lengths, thus exposing the paper strip at at least one end. This form of tube vent may be incorporated in the structure of a thin, flat laminar battery in a variety of ways, has a highly desirable and uniform geometry for this purpose, and has been found to effect highly reproducible venting of excellent selectivity. In particular, the use of a paper strip surrounded by a thermoplastic wall as the venting system has been found greatly to improve the ability to exhaust hydrogen without losing too much water. This problem is particularly acute in thin, laminar batteries with relatively large external surface areas for use without external compressive stress applying members, in contrast, for example, to cylindrical cells where gas pressure venting mechanisms can be employed, and in which the volume of water present is large relative to the anode area. Prior art approaches to venting generally rely on a single gas diffusion barrier, such as gas-permeable membranes or fibers. The difficulty with this approach is that most materials of adequate hydrogen permeability have a much greater water vapor permeability, on a mole for mole basis. Thus, a fiber or membrane of the correct size for the amount of hydrogen to be transported out of the battery will also pass more water vapor than is desired for long shelf life, even though it is impermeable by liquid water. Surprisingly, the paper packed tube vent has been found to have excellent permaselectivity in this respect. While no complete theoretical explanation can be offered with any confidence, and it is not desired to be bound by such, experiments which have been performed suggest the hypothesis that a strip of paper surrounded by a hydrogen permeable, liquid impermeable wall presents two significant and differentially permaselective gas diffusion barriers. The liquid-impermeable wall appears to serve as the controlling impedance for hydrogen and oxygen diffusion, whereas the gas diffusion passage through and around the paper fibers appears to act as the controlling impedance for water vapor transport. This hypothesis has been evidenced by such vented batteries which exhibit a small and uniform decrease in thickness with shelf life, as opposed to unvented batteries which tend to grow in thickness much more on the average, and much less uniformly. Also, batteries vented in accordance with the invention do not change appreciably in weight, thus indicating that no significant water loss takes place during storage. This ability to retain water is particularly important in a photographic application where the battery is packaged with a group of film units, as the film units are sensitive to changes in relative humidity inside the hermetically sealed storage envelope that is provided.

The preferred mode of practicing the invention, and the construction of vents and batteries in accordance with the invention, will best be understood in the light of the following detailed description, together with the accompanying drawings, of various illustrative embodiments thereof.

In the drawings,

FIG. 1 is a fragmentary schematic perspective sketch of a laminate useful in the manufacture of vents in accordance with the invention;

FIG. 2 is a schematic fragmentary plan view, with parts omitted and parts broken away, illustrating the manufacture of strip stock as a step in the manufacture of vents in accordance with the invention;

FIG. 3 is a schematic perspective fragmentary sketch of a laminated strip formed by the process illustrated in FIG. 2;

FIG. 4 is a schematic fragmentary diagramatic perspective sketch illustrating the manufacture of tube vents from the strip stock illustrated in FIG. 3;

FIG. 5 is a cross sectional elevational sketch, on an enlarged scale, taken essentially along the lines 5—5 in FIG. 4 and illustrating a cross section through a finished vent strip manufactured in accordance with the invention;

FIG. 6 is a schematic elevational sketch illustrating a stage in the manufacture of tube vents from the laminated stock of FIG. 3 in accordance with a modification of the invention;

FIG. 7 is a schematic elevational sketch similar to FIG. 6 but showing a second stage in the process of manufacturing vents in accordance with the modified embodiment of the invention;

FIG. 8 is a fragmentary schematic perspective sketch of a tube vent manufactured in accordance with the process illustrated in FIGS. 6 and 7;

FIG. 9 is a diagramatic schematic perspective sketch illustrating the manufacture of a vented frame and separator sub-assembly in accordance with the invention;

FIG. 10 is a fragmentary diagramatic elevational sketch, on a modified scale, taken essentially along the lines 10—10 in FIG. 9 and illustrating certain components in more detail;

FIG. 11 is a schematic cross sectional view, on an enlarged scale, taken essentially along the lines 11—11 in FIG. 9;

FIG. 12 is a schematic cross sectional elevational sketch, on an enlarged scale, taken essentially along the lines 12—12 in FIG. 9;

FIG. 13 is a schematic elevational cross sectional sketch, on an enlarged scale, taken essentially along the lines 13—13 in FIG. 9;

FIG. 14 is a plan view, with parts broken away, of a completed vented battery frame and separator subassembly in accordance with the invention;

FIG. 15 is a schematic perspective sketch of a completed battery adapted to incorporate the vented frame of FIG. 14; and FIG. 16 is an enlarged fragmentary schematic elevational cross sectional sketch showing a partial section through the battery of FIG. 15 and taken substantially along the lines 16—16 in FIG. 15.

FIG. 1 shows a laminate 1 useful in the manufacture of battery vents in accordance with the invention. The laminate 1 comprises two sheets 2 of thermoplastic material bonded by heat and pressure to an intermediate sheet 3 of paper. The thermoplastic sheets 2 may be made of any suitable conventional polymeric resin that is liquid impermeable and suitably gas pervious and which is capable of being thermally bonded to itself and to paper. Suitable materials are copolymers of vinyl chloride and vinyl acetate, Sarans, and similar materials, with or without adhesive coatings. Saran films from 1 to 2 mils in thickness have been employed with success, as have vinyl films 5 to 10 mils in thickness of 85 vinyl chloride, 15 vinyl acetate by weight copolymer. These thicknesses of these different materials exhibit similar permeabilities. Polymers of vinyl chloride or of vinyl acetate are useable, but the former are harder, and the latter softer, than is most desirable. The paper 3 may be any conventional kraft or bond paper from 3 to 6 mils in thickness. It is preferably unsized and does not contain fillers such as clay or the like. The white bond paper commonly used in Xerox copying machines has been used quite successfully for the purpose.

The plastic sheets 2 are laminated to the paper 3 by suitable application of heat and pressure sufficient to make a temporary bond. The quality of the bond is not particularly important so long as it is good enough to keep the sheets together during the process of vent manufacture to be described. The heat and pressure applied during lamination should be kept well below values at which the plastic and/or adhesive would flow into the interstices between the paper fibers. The laminate 1 may be made up in any desired length and width, for example, in rolls as shown at 4 in FIG. 2 anywhere from a few inches to a few feet in width.

Referring to FIG. 2, a supply of laminate 1 on a roll 4 is slit, by means suggested as a bank of rotary knives 5, into strips 6 of, for example, 1/16 inches in width. The strips 6 are taken up on a suitable individual storage spools 8 arranged to be driven by a common shaft 7 and preferably provided with individual tension controls of any conventional variety, such as slip clutches or the like, so that uniform tension is maintained on the strips 6 during the slitting operation. Preferably, guides suggested at 9 are provided to keep the strips 6 in alignment during spooling. When the desired length of strip 6 has been accumulated on the spools 8, the strips are cut and the spools removed to be replaced by empty spools.

Referring to FIG. 3, each strip 6 may be so proportioned that a desired length of it can be cut off and used as a battery vent without further processing. For this purpose, a strip 1/16 inch wide and comprising a 4 mil sheet of paper 3a with 2 five mil polyvinyl chloride laminations 2a will have a plastic surface area that is about 18 times its exposed paper area along the length of the strip. Such a strip has been found to have adequate gas venting properties when buried in a gas permeable battery component in the manner to be described below. However, a tube vent, next to be described, is preferred as being more uniform and reliable in performance and being capable of manufacture with better yields.

Referring next to FIG. 4, strips 6 on reels 8 made as described above may be preheated and passed through a pair of heated nip rolls 10 and 11 in which the opposed plastic layers 2a are fused together to form a closed tube 2b about the paper strips 3a, as shown in FIG. 5. One or both of the rolls 10 and 11 preferably have a resilient surface, such as a rubber surface, whereas the other roll can be of metal.

The preheating may be accomplished by capturing the strips 6 between heated belts 10 and 11 which carry them through nip rollers and then pass through a cooling zone in which the strips regain their strength.

The cooled strips 6a may be spooled up on driven takeup reels 12 for storage and later use. Finished strips 6a may be ⅛ inch in width and 12 mils in thickness if the paper strip 3a is 4 mils in thickness and 1/16 inch in width.

FIGS. 6 through 8 illustrate the manufacture of tube vents in accordance with a modification of the invention.

FIG. 6 shows a conventional press comprising a fixed lower platen 20 and a moveable upper platen 21 between which a number of the strips 6 are placed. Shims 22, which in the embodiment to be described may comprise steel shims 0.012 inches in thickness, are placed in the press to limit the travel of the platen 21 towards the platen 20.

As suggested in FIG. 7, heat and pressure are applied between the platens 20 and 21 to form the outer plastic strips 2a into a coalescent tube 2c around the paper strips 3a. The tubes 6b so formed are then removed from the press and cut into strips of the desired length. In the forming process, the ends of the tubes 6b will usually be closed with plastic, but when the strips are cut to be incorporated in the battery as described below, at least one end will have the paper strip 3a exposed. Strips thus formed have vinyl walls about 4 mils in thickness on either side of the 4 mil plastic strip 3a. With the vinyl chloride-vinyl acetate copolymer described above, a temperature of about 300° F., with sufficient pressure to bring the platens together on the shims 22, have been successfully employed.

FIG. 9 illustrates schematically the preparation of vented battery frame and separator combinations in accordance with the invention, with details of conventional process apparatus omitted for clarity. As shown, a pair of the vent tubes 6a are supplied from storage reels 12 loaded as described in connection with FIG. 4. The strips 6a are fed between upper and lower laminate sheets 30 and 31, supplied from rolls 32 and 33, respectively.

As best shown in FIG. 10, the sheet 30 may comprise a sheet of thermoplastic frame material temporarily bonded to a sheet 35 of silicone release paper. If the frame material 34 is a non-blocking meaterial such as polyvinyl chloride, the release sheet 35 would not be needed. However, in accordance with one embodiment of the invention, Versalon 1140 resin, as made by General Mills Corp., of Minneapolis, Minn., and for example, 10 mils in thickness, is employed. This material is not non-blocking, and requires a release sheet for storage on rolls.

Similarly, the lower sheet 31 may comprise a sheet 36, of the same material and dimensions as the sheet 34, and temporarily bonded to a release sheet 37. In an exemplary embodiment, the sheets 30 and 31 may be 2.0 inches wide and the strips 6a spaced about 2 inches apart from inner edge to inner edge.

The sheets 30 and 31, and the intermediate strips 6a, are passed between a pair of heated nip rolls 38 and 39, whereby the thermoplastic sheets 34 and 36 are thermally bonded together and are bonded to the strips 6a. A laminate of the kind shown in FIG. 11 is formed. This laminate is then passed between the cutting dies, suggested as a fixed platen 40 and a moveable cutter 41, that cut out generally rectangular pieces 42 at spaced locations on the laminate to form windows 43 as shown in FIGS. 9 and 12.

When it is desired to prepare a laminate such as that shown in FIG. 11 but using strips 6 as described above in connection with FIG. 3 to form the vents without first forming full tubes, the laminating process just described should be carried out in such a way that a liquid impervious seal is formed between the sheets 34 and 36. The reason is to ensure that the paper strip is entirely surrounded, except at at least one end, by a liquid impermeable, gas-permeable thermoplastic wall. When tube vents are employed as described above, the quality of the seal between the sheets 34 and 36 is not particularly important, so long as an adequate mechanical bond between the sheets is obtained to hold the assembly together during further processing and before the final seal is produced as described below.

Another method of producing the desired construction in which the paper strip is embedded in a gas-permeable, liquid impermeable thermoplastic matrix, which method per se forms no part of this invention, is described in U.S. application for Letters Patent Ser. No. 852,921, filed concurrently with this application by Alfredo G. Kniazzeh, Dennis R. Mailloux and Kestutis Norvaisa for Vented Frame for Laminar Batteries and Methods of Making the Same, and assigned to the assignee of this application. As there shown and more fully described, in accordance with that method, the step of laminating the paper between thermoplastic sheets prior to cutting into strips and laminating between thermoplastic frame elements is omitted, and the paper strips are directly laminated between battery elements.

Continuing the description following the preparation of the laminate shown in FIG. 11 as described above, one of the release sheets 35 is next stripped from the laminate and transferred to a storage roll 44, exposing the thermoplastic surface of the strip 34. A cellophane separator 45 is then transferred onto the sheet in position covering the window 43, as shown in FIGS. 9 and 13. The separator 45 may be supplied from a stack 46 by a conventional pick-and-place mechanism, not shown, coupled with heating of the portion of the sheet 34 surrounding the window 43 if this surface is not still tacky enough from the laminating process to allow a temporary bond to the cellophane to be formed. Individual frame will later be cut off where indicated by the dotted lines 47, but for the time being, the vented frame and separator assemblies are transferred to a storage roll 48. Following the cutting operation, and the removal of the lower release sheet 37 at a desired stage, a finished vented frame and separator combination is as shown in FIG. 14.

FIG. 15 shows a completed battery 51 adapted to incorporate the frame and separator construction of FIG. 14. As indicated, the battery has a slightly raised central portion 52 surrounded by a slightly depressed peripheral portion 53 effected during the sealing operation to be described.

FIG. 16 shows a typical internal construction of the battery 51 and illustrates the placement of the frames therein. Details of a suitable battery construction are described more fully in abandoned U.S. application for Letters Patent Ser. No. 684,370, filed on May 7, 1976 by Edwin H. Land for Electrical Cells and Batteries and assigned to the assignee of this application.

As shown in FIG. 16, the battery 51 may be of a four cell variety having a cathode terminal assembly comprising a metal terminal sheet 60, which may be of steel or aluminum, and for example about 2 mils in thickness, bonded to a conductive plastic current collector sheet 61. Over this sheet 61 is deposited a first cathode slurry layer 62a within an opening 63 formed in a first frame 64a. The frame 64a may be generally the same as the frame 50 in FIG. 14, except that it may be formed of a single thickness of thermoplastic material twice the finished thickness of the frame 50 and does not require a vent.

A cellophane separator 65a is prebonded to the frame 64a in the manner described above, and covers the opening 63 in the frame 64a and overlies the cathode deposit 62a. A layer of gel electrolyte 66a is deposited over the separator 65a. This electrolyte, together with the electrolyte in the cathode mix 62a, will permeate the separator 65a and incidentally affect the temporary bond between the separator 65a and frame 64a. A first anode patch 67a is adhered to a conductive plastic intercell connector sheet 68a. The intercell connector 68a is ultimately bonded to and between the frame 64a and a next frame 64b identical to the frame 64a.

As shown, the second cell comprises a cathode layer 62b, cellophane separator 65b, gel electrolyte 66b and an anode 67b adhered to a thermoplastic intercell connector 68b. The next cell in the battery is surrounded by the frame 50, with its cellophane separator 45, and including the vent tube 6a, as described above. This cell is completed by a cathode layer 62c, and by gel electrolyte 66c between the separator 45 and the next anode 67c adhered to an intercell connector 68c. Next, there is a frame 64c, like the frames 64a and 64b, surrounding a cathode 62d and overlain by a separator 65c communicating with the upper anode 67d through gel electrolyte 66d. The last anode patch 67d is deposited on a conductive plastic anode current collector sheet 70, laminated to a metal terminal plate 71 of steel, aluminum or the like.

As illustrated in FIGS. 14 and 16, the vents 6a extend through the battery inside of the seal area, but participate in the seal area outside of the dotted line 4a as shown in FIG. 14 at the ends. It is necessary that one end of the paper strip 3a be exposed through the seal to effect the necessary venting operation.

In accordance with the preferred embodiment of the invention, batteries with one or more vents provided as described above are preferably sealed in a vacuum. The vacuum sealing of laminar batteries has been recommended in the prior art, in U.S. Pat. Nos. 2,870,235, 3,353,999, 3,563,805, 3,907,599, and 4,028,479. Experimental results have shown that laminar batteries vented in accordance with the invention and sealed under atmospheric pressure are more stable and have lower internal resistances after long periods of storage than similar batteries sealed under vacuum but without the venting mechanism of the invention, although the latter are better than controls with no vents sealed at atmospheric pressure. However, although it is surprising that vacuum sealing of a battery provided with one or more gas venting passages would have any long term effect, it has been found that such batteries are sufficiently superior to vented batteries sealed under atmospheric pressure to warrant the additional apparatus required. For example, one group of four lots of batteries were made as described above with the following differences; Lot 1 was a control group with no vents and sealed under atmospheric pressure; Lot 2 was a group with no vents and sealed under vacuum; Lot 3 was a group with tube vents as described above and sealed under atmospheric pressure; and Lot 4 was a group with tube vents as described above and sealed under vacuum. After 274 days, the open circuit voltage (OCV) and the closed circuit voltage (CCV) at a constant current of 1.635 amperes for these batteries were measured. From these measurements, the internal resistance Ri of each battery, in ohms, could be found as OCV-CCV/1.635. Averages for the several lots were as follows:

TABLE I

| Lot | Vent | Vacuum | Ri | Percent Improvement |
|---|---|---|---|---|
| 1 | No | No | .612 | Control |
| 2 | No | Yes | .398 | 35% |
| 3 | Yes | No | .306 | 50% |
| 4 | Yes | Yes | .264 | 57% |

The change in thickness of a laminar battery with time is another measure of the effectiveness of venting. For an application in which the battery is to be housed in a space of fixed dimensions, as in a film pack, any increase in thickness is extremely undesirable. Thickness measurements made on the above lots of batteries, 7 days after electrochemical assembly (ECA) and 274 days after ECA showed the following median changes:

TABLE II

| Lot | Vent | Vacuum | Change in Thickness, mils |
|---|---|---|---|
| 1 | No | No | +80 |
| 2 | No | Yes | +58 |
| 3 | Yes | No | −3 |
| 4 | Yes | Yes | −3.5 |

As noted above, no theoretical explanation for the performance of batteries vented in accordance with the invention has been definitely established. However, the experimental data are consistent with the hypothesis that water loss in a battery vented in accordance with the invention, for example, in grams per year, is proportional to $GrT^2$, where Gr is the Greiner porosity of the paper strip and T is the thickness of the paper. The Greiner porosity measures the air flow conductance of paper in a direction perpendicular to the plane of the paper. Various papers in thicknesses from 3 mils to 6 mils, and with Greiner porosities from 27 to 58 cubic centimeters of air per 5 seconds, has been successfully employed, and higher or lower values could be used if so desired. It is presently preferred to select the thickness and porosity such that $GrT^2$ is between 300 and 1200. With values of $GrT^2$ below 300, the hydrogen venting rate may be unduly attenuated, whereas values above 1200 may be associated with unnecessary water loss.

The water loss in batteries vented in accordance with the invention is only slighty correlated with the thickness of the gas-permeable, liquid impermeable thermoplastic material in which the paper strip is embedded. Batteries made with tube vents comprising 1/16 inch wide strips of paper in vinyl tubes were measured for water loss 274 days after ECA, as were similar batteries without vents. The unvented control batteries had a median water loss of 0.025 grams. Water loss W in the vented batteries is given in Table III below, in grams, together with the paper thickness T, in mils; the Greiner porosity Gr, in cubic centimeters of air per 5 seconds, the product $GrT^2$, and the thickness Vt of the vinyl tube, in mils:

TABLE III

| T | Gr | $GrT^2$ | Vt | W |
|---|---|---|---|---|
| 3 | 46 | 414 | 4.5 | .050 |
| 4 | 27 | 432 | 2.5 | .060 |
| 4 | 27 | 432 | 2.5 | .050 |
| 4 | 27 | 432 | 4 | .050 |
| 4 | 27 | 432 | 4 | .060 |
| 4 | 27 | 432 | 4 | .050 |
| 4 | 58 | 928 | 4 | .080 |
| 5 | 38 | 950 | 3.5 | .080 |
| 5 | 46 | 1150 | 2 | .090 |
| 5 | 46 | 1150 | 2 | .100 |
| 5 | 46 | 1150 | 3.5 | .080 |
| 5 | 46 | 1150 | 3.5 | .090 |
| 6 | 51 | 1836 | 3 | .100 |

While the invention has been described with respect to the details of illustrative embodiments, many changes and variations will occur to those skilled in the art upon reading this description. Such can obviously be made without departing from the scope of the invention.

Having thus described the invention, what is claimed is:

1. A battery vent, comprising an elongated tube of liquid impervious, hydrogen permeable thermoplastic material filled with a thin, narrow elongated strip of paper, said tube being open at at least one end.

2. A battery vent, comprising a strip of paper encased on at least four sides in a sheath of liquid impervious, hydrogen permeable thermoplastic resin and having at least one end exposed.

3. A battery vent, comprising a composite strip of thermoplastic resin and paper having at least one external paper surface and at least one external resin surface, said external resin surface having a substantially greater area than said external paper surface.

4. The battery vent of claim 3, in which said composite strip comprises a thin, narrow elongated strip of paper laminated between two thin narrow elongated strips of thermoplastic resin.

5. The battery vent of claim 3, in which said composite strip comprises an elongated tube of liquid impervious, hydrogen permeable material filled with an elongated strip of paper.

6. A battery vent, comprising an elongated tube of vinyl resin filled with an elongated strip of paper.

7. The battery vent of claim 6, in which said vinyl resin is a copolymer of vinyl chloride and vinyl acetate.

8. The method of making battery vent stock, comprising the steps of laminating two sheets of liquid impervious, hydrogen permeable thermoplastic resin to opposite sides of a sheet of paper, and slitting said laminated sheet into narrow elongated strips.

9. The method of making battery vent stock, comprising the steps of laminating two sheets of liquid impervious, hydrogen permeable thermoplastic resin to a sheet of paper under sufficient heat and pressure to establish a bond sufficient to allow the laminate to be handled as a unit, slitting the laminate into thin elongated strips, and heating the strips under pressure to fuse the plastic strips on either side of each paper strip together into a paper filled plastic tube.

10. The method of making vented battery frame stock, comprising the steps of feeding a pair of spaced parallel elongated plastic tubes each filled with a paper strip between confronting sheets of thermoplastic sheet material through a pair of heated nip rolls to adhere the confronting thermoplastic sheets together and thereby enclose the tubes, and cutting apertures through the adhering sheets between the tubes to form a vented ladder of battery frames.

11. The method of making vented battery frame and separator subassembly stock, comprising the steps of feeding a pair of spaced parallel elongated plastic tubes each filled with a paper strip between confronting sheets of thermoplastic sheet material through a pair of heated nip rolls to adhere the confronting thermoplastic sheets together and thereby enclose the tubes, cutting windows through the adhering sheets between the tubes to form a vented ladder of battery frames, and tacking a cellophane separator over each of said windows with heat and pressure to form a temporary bond permitting the stock to be handled as a unit.

12. The method of making vented battery frames comprising the steps of feeding a pair of spaced parallel elongated plastic tubes each filled with a paper strip between confronting sheets of thermoplastic sheet material through a pair of heated nip rolls to adhere the confronting thermoplastic sheets together and thereby enclose the tubes, cutting windows through the adhering sheets between the tubes to form a vented ladder of battery frames, adhering a cellophane separator over each of said windows, and cutting said adhering sheets and the tubes enclosed thereby between said separators to form vented frame and separator subassemblies.

13. The method of making vented battery frame stock, comprising the steps of laminating an elongated plastic tube filled with a paper strip between confronting sheets of thermoplastic sheet material under heat and pressure to adhere the confronting thermoplastic sheets together and thereby enclose the tube, said tube being located closer to one edge of said confronting strips than to the other in a direction normal to the direction of elongation of said tube, and cutting windows through the adhering sheets between the tube and the edge farthest from the tube to form a vented ladder of battery frames.

14. The method of making vented battery frame and separator subassembly stock, comprising the steps of laminating at least one tube filled with a paper strip between confronting sheets of thermoplastic sheet material by adhering the confronting thermoplastic sheets together to thereby enclose the tube, cutting windows through the adhering sheets alongside the tube to form a vented ladder of battery frames, and adhering a separator over each of said windows to form a bond permitting the stock to be handled as a unit.

15. The method of making vented battery frames, comprising the steps of laminating an elongated plastic tube filled with a paper strip between confronting sheets of thermoplastic sheet material near one edge of said sheets by adhering the confronting thermoplastic sheets together to thereby enclose the tube, cutting windows through the adhering sheets in regions spaced from the paper to form a vented ladder of battery frames, adhering a separator over each of said windows, and cutting said adhering sheets and the tube enclosed thereby between said separators to form vented frame and separator subassemblies.

16. A battery frame construction adapted to permit electrolyte migration between electrodes in a cell within a battery and to permit venting of gas produced within the battery, comprising a closed loop of gas-permeable, liquid-impermeable material, said loop defining an open area within the loop and an outer periphery having dimensions substantially corresponding to the outer periphery of the battery; and at least one vent comprising a paper strip embedded in said loop and extending along one side at least to said outer periphery.

17. The frame construction of claim 16 wherein the vent is positioned between and sealed to a pair of said loops.

18. The frame construction of claim 16 which includes at least two of said battery vents.

19. The method of making vented battery frame stock, comprising the steps of laminating at least one elongated strip of battery vent stock between confronting sheets of thermoplastic sheet material by adhering the confronting thermoplastic sheets together to thereby enclose the vent stock, and cutting windows through the adhering sheets in regions spaced from the vent stock to form a vented ladder of battery frames.

20. The method of making vented battery frame and separator subassembly stock, comprising the steps of laminating at least one strip of battery vent stock between confronting sheets of thermoplastic sheet material by adhering the confronting thermoplastic sheets together to thereby enclose the strip of vent stock, cutting windows through the adhering sheets alongside the strip to form a vented ladder of battery frames, and adhering a separator over each of said windows to form a bond permitting the stock to be handled as a unit.

21. The method of making vented battery frames comprising the steps of laminating at least one elongated strip of vent stock between confronting sheets of thermoplastic sheet material by adhering the confronting thermoplastic sheets together to thereby enclose the strip of vent stock, cutting windows through the adhering sheets alongside the strip to form a vented ladder of battery frames, adhering a separator over each of said windows, and cutting said adhering sheets and the strip of vent stock enclosed thereby between said separators to form vented frame and separator subassemblies.

22. A battery frame construction adapted to permit electrolyte migration between electrodes in a cell within a battery and to permit venting of gas produced within the battery, comprising two closed loops each comprising a flat substrate with both surfaces comprising an adhesive composition, said loops defining an open area within the loops and an outer periphery having dimensions substantially corresponding to the outer periphery of the battery; at least one narrow elongated paper strip extending alongside said open area between said loops at least to said outer periphery and being sealed to and between said loops; said loops being sealed together.

23. A battery frame construction adapted to permit electrolyte migration between electrodes in a cell within a battery and to permit venting of gas produced within the battery, comprising two closed loops each comprising a flat substrate with both surfaces comprising an adhesive composition, said loops defining an open area within the loops and an outer periphery having dimensions substantially corresponding to the outer periphery of the battery; at least one battery vent extending alongside said open area between said outer periphery and said open area at least to said outer periphery and being sealed to said loops; and an electrolyte-permeable membrane sealed to one of said loops to cover said open area, said battery vent comprising a paper strip.

24. A battery frame construction adapted to permit electrolyte migration between electrodes in a cell within a battery and to permit venting of gas produced within the battery, comprising two closed loops each comprising a flat substrate with both surfaces comprising an adhesive composition, said loops defining an open area within the loops and an outer periphery having dimensions substantially corresponding to the outer periphery of the battery; at least one battery vent extending between said loops alongside said open area at least to said outer periphery and spaced from said open area and said outer periphery; said vent being sealed to said loops; and an electrolyte-permeable membrane sealed to at least one of said loops to cover said open area, said battery vent comprising a paper strip enclosed along its length by a gas-permeable, liquid-impermeable plastic composition.

* * * * *